Figure 1:
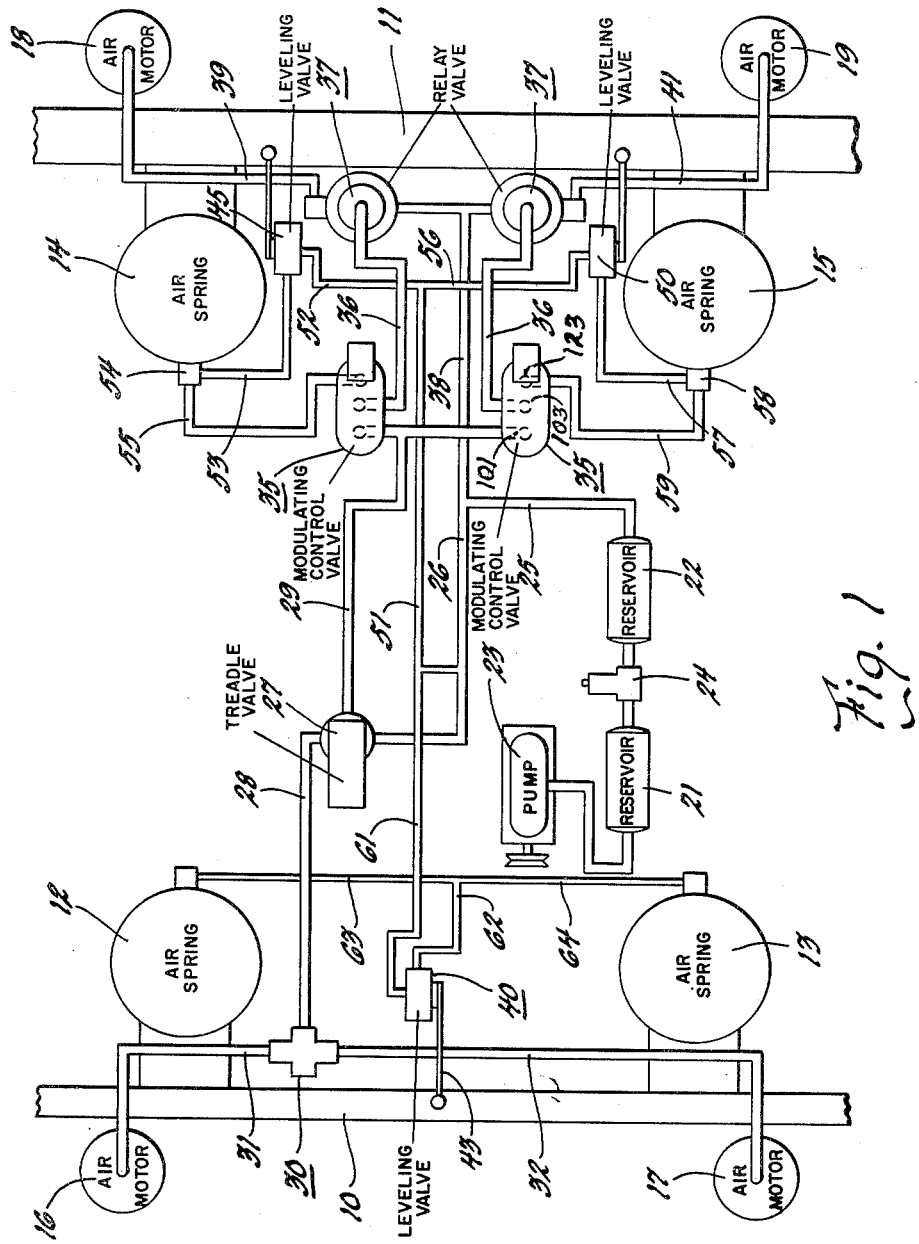

Oct. 23, 1962   J. E. WHELAN   3,059,976
LOAD RESPONSIVE MODULATING VALVE FOR FLUID BRAKE SYSTEM
Filed Aug. 19, 1960   3 Sheets-Sheet 2

INVENTOR.
James E. Whelan
BY
D. C. Staley
HIS ATTORNEY

INVENTOR.
James E. Whelan

United States Patent Office 3,059,976
Patented Oct. 23, 1962

3,059,976
LOAD RESPONSIVE MODULATING VALVE FOR FLUID BRAKE SYSTEM
James E. Whelan, Dayton, Ohio, assignor to General Motors Corporation, Detroit, Mich., a corporation of Delaware
Filed Aug. 19, 1960, Ser. No. 50,751
8 Claims. (Cl. 303—60)

This invention relates to a fluid brake system for a motor vehicle, and more particularly to an air pressure brake system for a motor vehicle that includes a suspension system having air springs supporting the sprung mass of the vehicle on the unsprung mass. Even more particularly, the invention relates to a modulating control valve that is adapted to increase the braking effort on certain wheels of the vehicle in response to the load carried by the vehicle, and specifically in response to the load carried by the axle supporting the wheels, in which the brake effort is varied in proportion to the load carried by the axle of the vehicle.

In the conventional fluid brake or air brake system on a vehicle, the brake effort is divided between the front and rear wheels of the vehicle in a fixed proportion so that equivalent pressure value applied to the brakes at the front and rear of the vehicle will apply the brakes in the fixed predetermined proportional brake effort. This type of brake system makes no allowance for increase of weight over one axle of the vehicle so that the brake effort on the wheels carried by that axle can be increased in proportion to the load carried by the axle. This is particularly important in cargo carrying vehicles since the brake effort at the axle should be relatively light under a light load condition and should be increased as the load on the axle increases. This is true whether the vehicle is of the unit type with front and rear axles or whether the vehicle is of the trailer type in which the rear wheels of the tractor carry an increasing load as the trailer vehicle is increased in load. Also, as the load increases on the trailer vehicle, the brake effort should be increased on the trailer wheels to obtain a greater braking effort in proportion to the heavier load carried.

It is therefore an object of this invention to provide a fluid brake or air brake system for a motor vehicle which includes a modulating valve that can control the fluid pressure supplied to one or more brakes of a vehicle to increase the brake effort applied by the brake in proportion to the load increase of the vehicle and more specifically in response to the load increase at any axle of the vehicle. This is accomplished by making the modulating control valve responsive to the fluid pressure in the air spring that supports the sprung mass on the unsprung mass of the vehicle so that, as the air pressure in the air spring increases, the modulating control valve will apply an increasing air pressure into the valve mechanism to increase the fluid pressure supplied to the brake of the axle wheel that supports the increased load.

Further objects and advantages of the present invention will be apparent from the following description, reference being had to the accompanying drawings wherein a preferred embodiment of the present invention is clearly shown.

Figure 2:
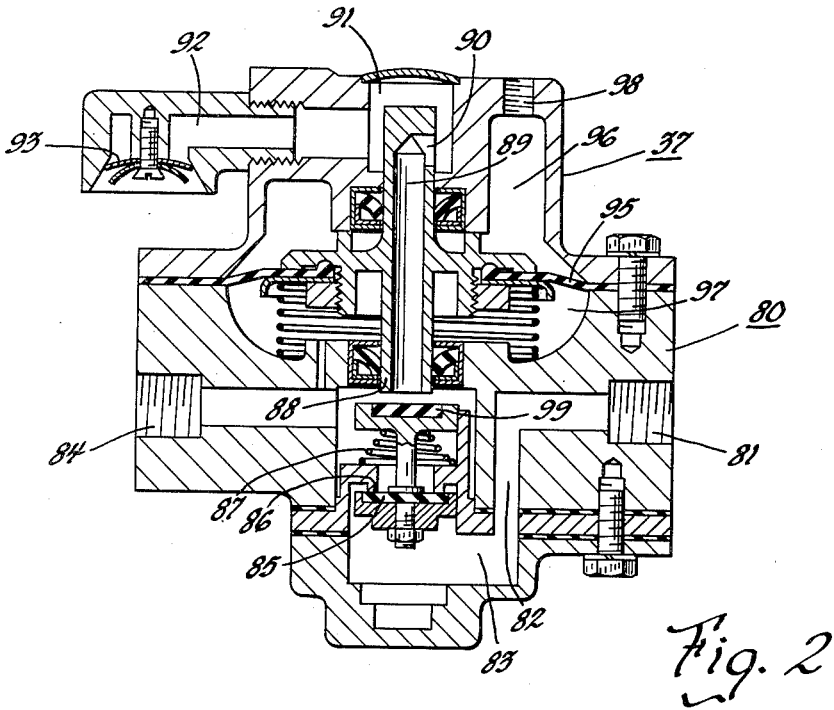
Figure 3:
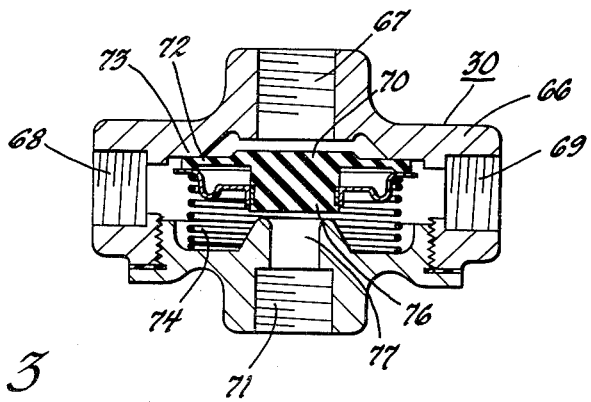
Figure 4:
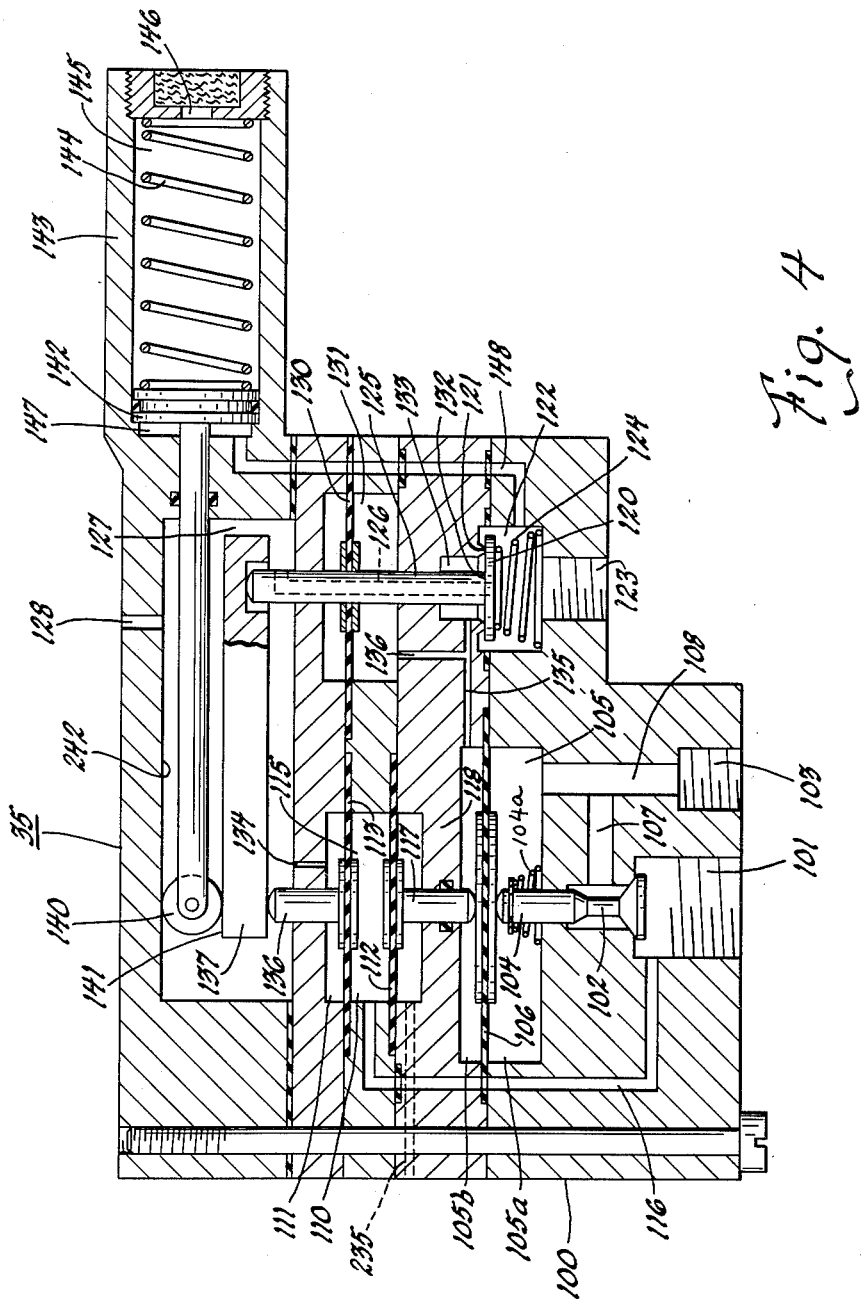

In the drawings:
FIGURE 1 is a schematic illustration of an air brake system incorporating the modulating control valve of this invention;
FIGURE 2 is a vertical cross sectional view of a relay valve used in the air brake system shown in FIGURE 1;
FIGURE 3 is a vertical cross sectional view of a quick release valve incorporated in the air brake system shown in FIGURE 1;
FIGURE 4 is a vertical cross sectional view of a modulating control valve incorporating features of this invention.

In FIGURE 1 there is illustrated schematically a vehicle incorporating the air brake system that includes the modulating control valve of this invention, the vehicle having a front axle 10 and a rear axle 11. The front axle has associated therewith the two air springs 12 and 13 at opposite sides of the vehicle to support the sprung mass of the vehicle on the axle or the unsprung mass. At the rear of the vehicle there is provided the air springs 14 and 15 at opposite sides of the vehicle which also support the sprung mass of the vehicle on the unsprung mass or the rear axle 11. The air springs 12 and 13, 14 and 15 may be of any conventional construction supporting the sprung mass or the body of the vehicle on the unsprung mass or the axle and wheel assemblies.

At the front of the vehicle there is provided the air motors or fluid motors 16 and 17 that are adapted to operate the brakes of the individual wheels at the front end of the vehicle. At the rear end of the vehicle there is provided the air motors 18 and 19 that are adapted to operate the brakes at the rear end of the vehicle. These air motors are of any conventional construction and are adapted to operate conventional fluid operated or air operated brakes.

The air springs of the suspension system for the vehicle as well as the air motors for the brakes of the vehicle are supplied with air under pressure from the series arranged reservoirs 21 and 22 that are supplied with air under pressure from a compressor 23 suitably driven from the engine of the vehicle. A high pressure safety valve 24 controls the maximum pressure applied in the high pressure side of the air system.

Air under pressure is supplied through the conduit 25 and thence into the conduit 26 which connects with the foot operated treadle valve 27 that is under control of the operator of the vehicle, the treadle valve 27 controlling supply of air under pressure into the conduits 28 and 29. Air under pressure in the conduit 28 is supplied to a quick release valve 30 that is more particularly shown in FIGURE 3, the quick release valve 30 being connected with the air motors 16 and 17 through the conduits 31 and 32 respectively for supply of air under pressure to the air motors and release of air from the air motors.

Air pressure is also supplied through the conduit 29 to the modulating control valves 35 that are more particularly shown in FIGURE 4, the modulating control valves 35 each supplying fluid under pressure through its respective supply line 36 to its respectively controlled relay valve 37 that is more particularly shown in FIGURE 2. The relay valve 37 in turn controls the main supply of air pressure or fluid pressure to the air motors 18 and 19 through the conduit branch 38 and thence through the conduits 39 and 41 to the air motors 18 and 19 respectively.

The relay control valves 37, more particularly shown in FIGURE 2, do not provide for direct supply of fluid pressure to the air motors 18 and 19 from the treadle valve 27, but rather these relay valves are actuated by the air pressure supplied through the treadle valve 27 and they in turn open main control valves which allow for a large volume of air to be supplied from the reservoir 22 to the air motors 18 and 19 for operation of the brakes. Thus a small volume of air supplied to the relay valves 37 will control flow of a very large volume of air to the brakes.

Air under pressure is supplied to the air springs 12 and 13 at the front end of the vehicle by means of a height regulating or leveling valve 40 that responds to changes in clearance height between the sprung mass and the unsprung mass of the vehicle. The leveling valve 40 may be of a type shown in the patent to E. F. Rossman 2,670,201 dated February 23, 1954 and assigned to the assignee of this application. The leveling valve 40 is connected by means of the actuating arm 43 with the front axle 10 of the vehicle to respond to changes in clearance height between the sprung mass and the unsprung mass of the vehicle so that, as the load in the vehicle increases to compress or collapse the air springs, the leveling valve 40 will open to allow air under pressure to be supplied to the air springs 12 and 13 to offset the increase in load in the vehicle and return the sprung mass of the vehicle to a predetermined clearance height relative to the unsprung mass. Similarly on a decrease of load in the vehicle, the leveling valve 40 will cause fluid under pressure in the air springs 12 and 13 to exhaust from the air springs so that the sprung mass of the vehicle can return to a predetermined clearance height relative to the unprung mass of the vehicle.

The air spring 14 at the rear axle of the vehicle is supplied with air under pressure by means of the leveling valve 45 while the air spring 15 is similarly supplied with air under pressure from a leveling valve 50. Both leveling valves 45 and 50 can be of the same type as valve 40 which may be like that disclosed in the patent to E. F. Rossman 2,670,201 heretofore mentioned. Thus the leveling valves 45 and 50 respond to increased load in the sprung mass of the vehicle, as applied to the axle 11 of the vehicle to increase air pressure in the air springs 14 and 15 as the load in the vehicle increases and will decrease air pressure in the air springs whenever the load is lightened in the vehicle.

Thus the air pressure in the air springs of the vehicle is directly proportional to the load carried by the vehicle and specifically in proportion to the load carried by the respective axles of the vehicle with which the respective air springs are associated.

The modulating control valves 35 that receive air under pressure from the treadle valve 27 through the conduit 29 supply air under pressure to the respective relay valves 37 by their respective conduit lines 36. However, the fluid pressure in the lines 36 that supply the relay valves 37 is varied by the modulating control valve 35 in response to increase and decrease of fluid pressure in the air springs 14 and 15 respectively so that as the load in the vehicle increases the brake effort applied at the rear wheels under control of the air motors 18 and 19 will be increased in direct proportion to the increase of load in the vehicle and will be decreased in proportion to a decrease in load in the vehicle, the increase and decrease of load in the vehicle being reflected by the change in air pressure in the air springs 14 and 15 which are under control of the height regulating or leveling valves 45 and 50 respectively as heretofore described.

Air under pressure is supplied to the air spring 14 through the conduit 51 and by the branch conduit 52 under control of the height control or leveling valve 45 to the conduit 53 by way of a fittting 54, the fitting 54 also connecting with the conduit 55 that connects with the modulating control valve 35 to vary the setting of the modulating control valve in a manner hereinafter described with reference to FIGURE 4. Similarly, the air spring 15 is supplied with fluid under pressure by the leveling valve 50 from the conduit 56 and thence through the conduit 57 to a fitting 58 which in turn is connected by the conduit 59 to the modulating control valve 35 for the air motor 19.

Air under pressure is supplied to the front air springs 12 by way of the conduit 61 thence to the conduit 62 which branches through the conduits 63 and 64 to supply the air springs 12 and 13 respectively in response to the actuation of the height regulating or leveling valve 40.

The quick release valve 30 is more particularly shown in FIGURE 3, and includes a valve body 66 that has a port opening 67 to which the line 28 is connected. The ports 68 and 69 are connected with the conduits 31 and 32 respectively for supply of air under pressure to the air motors 16 and 17 that operate the brakes of the front wheel of the vehicle. A valve member 70 is provided internally in the valve 30 for control of air under pressure to the air motor 16 and 17 and exhaust of air therefrom through the port 71.

The valve member 70 comprises a diaphragm member 72 that closes the inlet port opening 67 as shown in FIGURE 3, the diaphragm being held on its seat 73 by means of a compression spring 74 and a spring retainer 75. The central portion 76 of the valve element 70 slides within the spring retainer 75 and is adapted to close the port passage 77 that connects with the exhaust port 71.

When fluid under pressure is supplied through the line 28 under control of the treadle valve 27, the pressure entering the port 67 of the quick release valve 30 urges the central member 76 downwardly against the port opening 77 to close this port, the periphery of the diaphragm 72 remaining on its seat 73 as shown in FIGURE 3. This closes the exhaust port 71 so that further increase of fluid pressure in the line 28 will urge the periphery of the diaphragm 72 downwardly away from its seat 73 for supply of air under pressure through the ports 68 and 69 to the air motors 16 and 17 respectively.

When pressure is released in the line 28 by the treadle valve 27, for release of the brakes, the valve element 70 will return to the position shown in FIGURE 3 and thereby open the exhaust port 71 for air under pressure to exhaust from the air motors 16 and 17 backward through the ports 68 and 69 and thence through the exhaust port 71.

The relay control valves 37 are both identically constructed and are therefore shown in FIGURE 2. The relay control valve comprises a valve body 80 having an inlet port 81 that connects with a passage 82 supplying a chamber 83 with fluid under pressure from the conduit 38. The valve body 80 also has an outlet port 84 that connects with the respective line 39 or 41 for the air motors 18 and 19.

Between the inlet port 81 and the outlet port 84 there is provided a control valve 85 that normally closes on the valve seat 86 as held by compression spring 87.

The valve element 85 is opened by an actuating member or plunger 88 that has an axial passage 89 at a side port 90 that allows exhaust of fluid from the ports 84 and 81 of the valve into the chamber 91 and thence through the passage 92 through the check valve 93 when the air under pressure is released from the modulating control valve.

To control operation of the valve element 85, the actuating member or plunger 88 is carried on a diaphragm 95 that separates the chamber 96 from the chamber 97. The port 98 is supplied with fluid under pressure from the line 36 that is controlled by the modulating control valve 35 as hereinafter described, the air pressure entering chamber 96 thereby being varied in response to operation of the modulating control valve 35 as controlled by the air pressure from the air springs 14 and 15 respectively.

As shown in FIGURE 2, the relay valve 37 is exhausting air from the air motors 18 and 19 through the check valve 93. When air under pressure is supplied through the port opening 98 into the chamber 96 of the relay valve, the diaphragm 95 is urged downwardly to carry the actuating member 88 downwardly against the upper end 99 of the valve member 85 to close the exhaust passage 89. Further movement of the diaphragm 95 will then open the valve element 85 to allow air under pressure to be supplied from the port opening 81 to the port opening 84 for supply of fluid under pressure to the respective air motor controlled by the relay valve 37. The degree of opening of the valve 85 and the air pressure applied to the respective air motor is controlled by the fluid pressure value existing in the chamber 96. Thus, whenever the air pressure is increased in the chamber 96, the valve member 85 will be opened to a greater extent to provide for higher applied pressure to the respective air motors 18 and 19 to increase the brake effort on the brakes controlled thereby. This air pressure in the chamber 96 is controlled by the modulating control valve 35 in a manner hereinafter described.

The modulating control valve 35 shown in FIGURE 4 consists of a valve body 100 having an inlet port 101 that is connected with the air pressure inlet line 29 from the manually operated treadle control valve 27. This inlet port 101 contains a first valve member 102 that controls flow of fluid pressure from the port 101 to the outlet port 103 that is connected with the line 36 that controls supply of fluid under pressure to the inlet port 98 of the relay valve shown in FIGURE 2 and thereby controls fluid under pressure supplied to the chamber 96 of the relay valve.

The upper end of the first control valve 102 is in the form of a plunger 104 that extends into a chamber 105, a compression spring 104a being provided around the plunger end 104 of valve 102 to hold it in closed position as shown in FIGURE 4.

Chamber 105 is divided into two chamber portions 105a and 105b by means of a diaphragm 106 that is engaged by the upper end 104 of valve element 102. The outlet port 107 from the valve element 102 is connected with the chamber 105 by means of a port 108 and it also connects with the outlet port 103 that supplies the relay valve 37 with air under pressure through the line 36.

The inlet valve 102 is operated by pressure actuated or pressure operated device 110 that consists of a chamber 111 containing the two diaphragms 112 and 113 spaced from one another to provide a fluid pressure receiving space 115 between the diaphragms 112 and 113. This pressure receiving space 115 is connected with the inlet side of the valve 102, that is, with the inlet port 101 by means of the conduit passage 116 so that fluid under pressure supplied to the inlet port 101 of the valve 102 under control of the treadle valve 27, as supplied through the line 29, will also be supplied into the chamber space 115 between the diaphragms 112 and 113.

The diaphragm 112 has a plunger member 117 that extends through the wall 118 into engagement with the diaphragm 106 so that fluid pressure supplied within the chamber 115 will operate through the diaphragm 112 and plunger 117 to move the diaphragm 106 downwardly and thereby push the valve element 102 downwardly to open the valve when fluid under pressure is supplied into the chamber space 115 between the diaphragms 112 and 113.

A second control valve 120 that consists of a valve disk seated on a valve seat 121 is contained in a chamber 122 that has an inlet port 123 that in turn is connected with the respective line 55 or 59 to connect the respective air spring 14 or 15 with the respective modulating control valve 35, as shown in FIGURE 1. Thus the chamber space 122 that contains the control valve 120 is responsive to the fluid pressure contained in the respective air spring 14 or 15.

The valve member 120 is retained on its seat 121 by a compression spring 124 and is adapted to be pushed off its seat 121 by means of an actuating member 125 that has an axial passage 126 extending through the same which terminates at its upper end in the chamber 127 that is vented through the vent opening 128.

The actuating member 125 is carried on a diaphragm 130 that spans the chamber 131. Thus the bottom end 132 of the member 125 engaging the valve disk 120 forms a valve element with the valve disk which, under conditions of operation shown in FIGURE 4, is closed to prevent loss of fluid under pressure from the chamber 133 through the exhaust port 126 into the chamber 127 and thereby through vent 128.

The chamber 133 on the outlet side of the disk valve 120 is connected with the chamber space 105b of the chamber 105 by means of a passage 135, passage 135 also being connected with the chamber space 131 below the diaphragm 130 by means of a passage 136 so that the chamber space 131 below the diaphragm 130 is constantly at the fluid pressure in the chamber space 105b.

The chamber space above the diaphragm 113 is vented to the chamber 127 by the port 134 and the chamber space below the diaphragm 112 is vented to the atmosphere through the port 235.

The diaphragm 113 carries a plunger member 136 that engages a bridging member 137 that connects the plunger member 136 with the actuating member 125, as shown in FIGURE 4. A fulcrum member 140, in the form of a roller, is placed between the top surface 141 of the bridging member 137 and the chamber wall 242 of the chamber 127. This fulcrum roller is adapted to be moved from the position shown in FIGURE 4 in axial alignment with the plunger 136 to any position to a right-hand position of that shown in the drawing as controlled by the piston 142 in the cylinder 143. Normally, the fulcrum roller 140 is held in the position shown in the drawing by the compression spring 144 contained in the cylinder chamber 145 that is vented to the atmosphere through the vent port 146.

The cylinder space 147 at the left-hand end of the piston 142 communicates with the inlet chamber 122 for the modulating control valve 120 by means of the passage 148 so that the air spring pressure that stands in the chamber 122 will also stand at the left-hand side of the piston 142 in the chamber space 147.

Normally, the spring 144 will balance the pressure of the fluid or air in the chamber 147 when the vehicle is in an unloaded condition so that the fulcrum roller 140 is in the position shown in the drawing.

When the modulating control valve has the elements thereof in the position shown in FIGURE 4, and air is supplied to the inlet port 101 under control of the treadle valve 27, fluid under pressure supplied into the chamber space 115 will cause the plunger 117 to move downwardly to open the valve 102 and supply fluid under pressure through the passage 107 to the relay valve 37 through the port 103. Under this condition of operation, the plunger 136, being in axial alignment with the axis of the fulcrum roller 140 will produce no movement of the bridging member 137. Thus, the air pressure supplied to the air motor under control of the modulating control valve 35 will be in direct response to the air pressure as supplied from the treadle valve 27, as controlled by the relay valve 37 in a manner heretofore described.

When the load on the rear axle of the vehicle increases, requiring the height leveling valves 45 and 50 to increase the air pressure in the air springs 14 and 15 to offset the increase load to maintain the predetermined clearance height between the sprung mass and the unsprung mass of the vehicle, the air pressure will be increased in the inlet port 123 of the modulating control valve 35 and thereby in the chamber space 147 to move the piston 142 in a right-hand direction against spring 144 and thereby move the fulcrum roller 140 in the right-hand position to a position between the plunger member 136 and the actuating member 125.

When this action occurs, and air under pressure is supplied into the chamber space 115 of the modulating control valve, the diaphragm 113 will move the plunger 136 upwardly so that with the fulcrum roller positioned in a right-hand position out of alignment with the axis of the plunger 136, the bridging member 137 will have its right-hand end moved downwardly against the actuating member 125 so as to move the disk valve 120 downwardly from its seat 121 and allow air pressure from the chamber 122 to pass into the chamber 133 and thence through the passage 135 into the chamber space 105b above the diaphragm 106. Concurrently, the pressure is also applied through passage 136 into the chamber space 131 below the diaphragm 130.

When this occurs, the force effect of the air under pressure in the chamber space 105b is added to the force effect of the fluid pressure in the chamber space 115, thereby increasing the opening of the control valve 102 and increase the fluid pressure supplied to the relay valves 37, and thereby in turn cause the relay valves to open wider and allow an increased fluid pressure to be supplied to the air motors 18 and 19 for increased brake effort at the brakes.

It will be obvious that as the air pressure increases in the air springs, and thereby increases the pressure in the chamber 122 for supply to the chamber space 147, the fulcrum roller 140 will be moved further to the right-hand position so that, as the load in the vehicle is increased, the value of air pressure supplied to the brakes by operation of the mechanism heretofore described will be increased in direct proportion to the increase in load in the vehicle and thereby increase the brake effort in proportion to the load increase in the vehicle.

When the brake is released, by operation of the treadle valve 27, fluid under pressure will exhaust from the chamber space 115 and the relay valve will return to the position shown in FIGURE 2 to allow exhaust of air from the chamber space 105 of the modulating control valve. At this time air under pressure will still be retained in the chamber space 105b causing diaphragm 130 to be moved upwardly and thereby lift the lower end of the member 125 from the valve disk 120 even though it seats on its seat 121. This lifting of the end 132 of the member 125 from the valve disk 120 will allow the fluid under pressure to exhaust from the chamber space 131 below the diaphragm 130 back through the port 126 in the member 125 and escape through the chamber 127 through the vent 128, thus resetting the mechanism to the position illustrated in FIGURE 4 in readiness for another brake application.

While the embodiment of the present invention as herein disclosed, constitutes a preferred form, it is to be understood that other forms might be adopted.

What is claimed is as follows:

1. A fluid modulating valve for use in a fluid brake system, comprising, a first brake actuating fluid flow control valve for regulating brake applying fluid pressure, fluid pressure actuated means for actuating said first control valve, a second fluid flow control valve for regulating flow of a modulating fluid pressure to said fluid pressure actuated means to modify the effect of the same in response to fluid pressure value applied thereto as controlled by said second control valve, a proportioning device connecting said fluid pressure actuated means for said first control valve with said second control valve to actuate said second control valve by said fluid pressure actuated means, means responsive to fluid pressure at the inlet of said second control valve for actuating said proportioning device to increase fluid pressure flow through the said second valve as the fluid pressure at said second control valve increases, and fluid conduit means connecting said second control valve with said pressure actuated means for said first control valve to increase pressure fluid flow through said first valve in proportion to fluid pressure increase at said second valve.

2. A fluid modulating valve for use in a fluid brake system on an automotive vehicle incorporating a fluid suspension system having a fluid spring, comprising, a first brake actuating fluid flow control valve for regulating brake applying fluid pressure, fluid pressure actuated means for actuating said first control valve, a second fluid flow control valve for regulating flow of a modulating fluid pressure from a fluid spring on the vehicle to said fluid pressure actuated means to modify the effect of the same in response to fluid pressure value applied thereto from the fluid spring as controlled by said second control valve, a proportioning device connecting said fluid pressure actuated means for said first control valve with said second control valve to actuate said second control valve by said fluid pressure actuated means, means responsive to fluid spring fluid pressure at the inlet of said second control valve actuating said proportioning device to increase fluid pressure flow through said second valve as the fluid spring fluid pressure at the inlet of said second control valve increases, and fluid conduit means connecting said second control valve with said pressure actuated means for said first control valve to increase fluid pressure flow through said first valve in proportion to fluid spring fluid pressure increase at said second valve.

3. A fluid modulating valve for use in a fluid brake system, comprising, a first brake actuating fluid flow control valve for regulating brake applying fluid pressure, a fluid pressure receiving chamber partitioned by a diaphragm into a first and a second chamber, said diaphragm being connected with said first valve to operate the same, fluid pressure actuated means adapted to be operated by brake actuating fluid pressure connected with said diaphragm to open said first valve when said fluid pressure actuated means receives brake actuating fluid pressure, a second fluid flow control valve regulating flow of a modulating fluid pressure to said first chamber to add the force of the modulating fluid pressure to the force of said pressure actuated means to open said first valve, said second chamber adapted to be in fluid connection with brake applied fluid pressure to close said first valve against said forces, a proportioning device connecting said fluid pressure actuated means for said first control valve with said second control valve to actuate said second control valve by said fluid pressure actuated means, and means responsive to fluid pressure at the inlet of said second control valve actuating said proportioning device to increase fluid pressure flow through said second valve as the fluid pressure at said second valve increases, to increase thereby fluid pressure flow through said first valve and increase brake applying fluid pressure.

4. A fluid modulating valve for use in a fluid brake system, comprising, a first brake actuating fluid flow control valve for regulating brake applying fluid pressure, a fluid pressure receiving chamber partitioned by a diaphragm into a first and a second chamber, said diaphragm being connected with said first valve to operate the same, fluid pressure actuated means adapted to be operated by brake actuating fluid pressure connected with said diaphragm to open said first valve when said fluid pressure actuated means receives brake actuating fluid pressure, a second fluid flow control valve regulating flow of a modulating fluid pressure to said first chamber to add the force of the modulating fluid pressure to the force of said pressure actuated means to open said first valve, said second chamber adapted to be in fluid connection with brake applied fluid pressure to close said first valve against said forces, a proportioning device connecting said fluid pressure actuated means for said first control valve with said second control valve and including an actuating member engaging said second control valve to actuate said second control valve thereby by said fluid pressure actuating means, valve means including said actuating member and said second valve in fluid flow connection with said first chamber to vent fluid pressure from said first chamber on relative movement between said member and said second valve, and means responsive to fluid pressure at the inlet of said second valve actuating said proportioning device to increase fluid pressure flow through said second valve as the fluid pressure at the inlet of said second valve increases to increase thereby fluid flow through said first valve and increase brake applying pressure in proportion to the increase of fluid pressure at said second valve.

5. A fluid modulating valve constructed and arranged in accordance with the structure set forth in claim 4 wherein said fluid pressure actuating means for said first control valve comprises a chamber having a pair of spaced diaphragms therein, conduit means connecting the space between the said diaphragms and the inlet side of said first control valve, one of said diaphragms having plunger means extending into engagement with the diaphragm of the said fluid pressure receiving chamber, the other of the said diaphragms having plunger means extending into engagement with said proportioning device, said two plunger means effecting operation of said first control valve and said proportioning device concurrently on application of fluid pressure between the said two diaphragms from the inlet side of said first control valve.

6. A fluid modulating valve constructed and arranged in accordance with that set forth in claim 5 wherein the said proportioning device includes a bridge member connecting the said plunger means from one of the said two diaphragms with the said actuating member for engaging said second control valve, and includes a shiftable fulcrum member movable along the bridge member in response to pressure increase at the inlet side of said second control valve whereby said opening of said second control valve is proportioned to opening of said first control valve.

7. A fluid modulating valve for use in a fluid brake system, comprising, a first brake actuating fluid flow control valve for regulating brake applying fluid pressure, a first fluid pressure receiving chamber partitioned by a diaphragm into two chamber portions, said diaphragm being connected with said first valve to operate the same, one of said chamber portions being connected with the outlet side of said first valve to urge the said valve closed on increase of fluid pressure at the outlet side of said first valve, a second fluid pressure receiving chamber having a pair of spaced diaphragms therein forming movable walls one of which is connected with said diaphragm in said first chamber to operate said first valve on increase of pressure in the space between said spaced diaphragms, conduit means connecting the space between said spaced diaphragms with the inlet side of said first valve to move the said one diaphragm wall and thereby said first valve to open the same on increase of fluid pressure at the inlet side of said first valve, a second fluid flow control valve including a relatively movable actuating member for the same engaging said second control valve to actuate said second control valve, said member forming with said second valve a valve means in fluid flow connection with the other of said chamber portions of said first chamber to vent fluid pressure from said other chamber portion on relative movement between said member and said second valve, a bridging member connected with the other of said diaphragms in said second chamber and said actuating member for said second valve, a shiftable fulcrum for said bridging member including means actuated by fluid pressure at the inlet side of said second valve, and conduit means connecting the outlet side of said second valve with the said other of said chamber portions of said first chamber to add the force effect of the fluid pressure passed by said second valve to the force effect of the fluid pressure applied between said spaced diaphragms thereby to open said first valve.

8. A fluid modulating valve for use in a fluid brake system on an automotive vehicle incorporating a fluid suspension system that includes a fluid spring, said valve being constructed and arranged as set forth in claim 7 wherein the said means that is actuated by fluid pressure at the inlet side of said second valve is adapted to be connected with a fluid spring of the vehicle to increase the fluid pressure effect passed by said second valve to said other chamber portion of said first fluid receiving chamber to increase the fluid pressure passed by said first valve in response to pressure increase in the fluid spring of the vehicle.

References Cited in the file of this patent
UNITED STATES PATENTS
2,184,551     Hewitt _____ Dec. 26, 1939